US008294696B2

(12) United States Patent
Min et al.

(10) Patent No.: US 8,294,696 B2
(45) **Date of Patent: *Oct. 23, 2012**

(54) DISPLAY DEVICE AND METHOD OF DRIVING THE SAME

(75) Inventors: Ung-Gyu Min, Namyangju (KR); Oh-Kyong Kwon, Seoul (KR)

(73) Assignees: Samsung Display Co., Ltd., Yongin (KR); IUCF-HYU, Seoul (KR)

( * ) Notice: Subject to any disclaimer, the term of this patent is extended or adjusted under 35 U.S.C. 154(b) by 844 days.

This patent is subject to a terminal disclaimer.

(21) Appl. No.: 12/406,631

(22) Filed: Mar. 18, 2009

(65) Prior Publication Data

US 2010/0073335 A1 Mar. 25, 2010

(30) Foreign Application Priority Data

Sep. 24, 2008 (KR) ........................ 10-2008-0093766

(51) Int. Cl.
*G06F 3/038* (2006.01)
*G09G 5/00* (2006.01)

(52) U.S. Cl. ........................................................ 345/204

(58) Field of Classification Search .................. 345/204, 345/76, 81, 87, 207, 211, 214; 313/506
See application file for complete search history.

(56) References Cited

U.S. PATENT DOCUMENTS

| | | | | |
|---|---|---|---|---|
| 7,071,905 | B1 * | 7/2006 | Fan | 345/76 |
| 7,551,164 | B2 * | 6/2009 | Deane | 345/204 |
| 7,839,366 | B2 * | 11/2010 | Jung et al. | 345/81 |
| 7,843,132 | B2 * | 11/2010 | Choi | 313/506 |
| 2006/0273997 | A1 | 12/2006 | Nathan et al. | |
| 2007/0018919 | A1 * | 1/2007 | Zavracky et al. | 345/87 |
| 2007/0080905 | A1 * | 4/2007 | Takahara | 345/76 |
| 2007/0262931 | A1 | 11/2007 | Peng et al. | |
| 2008/0024476 | A1 * | 1/2008 | Choi et al. | 345/207 |
| 2009/0140959 | A1 * | 6/2009 | Nam et al. | 345/76 |
| 2009/0213046 | A1 * | 8/2009 | Nam | 345/76 |
| 2010/0073346 | A1 * | 3/2010 | Min et al. | 345/211 |
| 2010/0073357 | A1 * | 3/2010 | Min et al. | 345/214 |

FOREIGN PATENT DOCUMENTS

| | | |
|---|---|---|
| JP | 2007-203601 | 8/2007 |
| JP | 2007-240804 | 9/2007 |
| JP | 2007-264564 | 10/2007 |
| JP | 2008-032863 | 2/2008 |
| JP | 2008-058940 | 3/2008 |

(Continued)

*Primary Examiner* — Fred Tzeng
(74) *Attorney, Agent, or Firm* — H.C. Park & Associates, PLC

(57) ABSTRACT

The present invention provides a display device and a method of driving the same. The display device includes a plurality of display pixels to display an image, a plurality of data lines connected to the display pixel, and a plurality of sensing lines connected to the display pixel. Each display pixel includes: a driving transistor including a control terminal, an input terminal, and an output terminal; a capacitor connected to the control terminal of the driving transistor; a first switching transistor connected to the data line and the control terminal of the driving transistor; a light-emitting element to receive a driving current from the driving transistor, the light-emitting element to emit light; a second switching transistor connected between the sensing line and the output terminal of the driving transistor; and a third switching transistor connected between the output terminal of the driving transistor and the light-emitting element, wherein the driving transistor is a p-channel electric field effect transistor.

24 Claims, 9 Drawing Sheets

FOREIGN PATENT DOCUMENTS

| | | |
|---|---|---|
| JP | 2008-076741 | 4/2008 |
| KR | 10-0601329 | 7/2006 |
| KR | 10-0737376 | 7/2007 |
| KR | 10-0761868 | 9/2007 |
| KR | 10-0762138 | 9/2007 |
| KR | 10-2008-00011065 | 1/2008 |
| KR | 10-2008-0048230 | 6/2008 |
| KR | 10-2008-0050113 | 6/2008 |

* cited by examiner

DISPLAY DEVICE AND METHOD OF DRIVING THE SAME

CROSS REFERENCE TO RELATED APPLICATION

This application claims priority from and the benefit of Korean Patent Application No. 10-2008-0093766, filed on Sep. 24, 2008, which is hereby incorporated by reference for all purposes as if fully set forth herein.

BACKGROUND OF THE INVENTION

1. Field of the Invention

The present invention relates to an organic light emitting device and a method of driving the same.

2. Discussion of the Background

A pixel of an organic light emitting device includes an organic light emitting element and a thin film transistor (TFT) that drives the same.

The TFT may be classified into a polysilicon TFT and an amorphous silicon TFT according to the kind of an active layer included in the TFT. An organic light emitting device using a polysilicon TFT may have high electron mobility, good high frequency operation characteristics, and a low leakage current. However, it may not be easy to uniformly form characteristics of a semiconductor included in a TFT in a process of manufacturing an active layer with polysilicon. That is, a threshold voltage or mobility of the TFT may be different in each transistor. Accordingly, a luminance deviation may occur between a plurality of pixels that are included in the display device. Also, as a current is continuously supplied to an organic light emitting element, a threshold voltage of a polysilicon TFT may change and thus characteristics thereof may be degraded. Accordingly, even if the same data voltage is applied, a non-uniform current may flow to an organic light emitting element, and thus picture quality of the organic light emitting device may be degraded.

When a current flows for a long time period, the organic light emitting element may be degraded. Accordingly, even if the driving transistor applies a uniform current to the organic light emitting element, due to degradation of the organic light emitting element, luminance may decrease and thus picture quality may be deteriorated due to an afterimage, etc.

A hold type of flat panel display device such as an organic light emitting device displays a fixed image for a predetermined time period, for example for one frame, regardless of whether a still picture or a motion picture is displayed. For example, when displaying some object that continuously moves, the object stays at a specific position for one frame and stays at a position to which the object moves in a next frame, and thus motion of the object is discretely displayed. An object in a hold type display device moves after a time period of one frame. Because a time period of one frame is a time period in which an afterimage is sustained, even if the motion of the object is displayed in the way described above, the motion of the object may be continuously viewed.

However, when viewing a continuously moving object through a screen, because a line of sight of a person continuously moves along a motion of the object, the line of sight of a person collides with a discrete display method of the display device and thus a blurring phenomenon of a screen may occur. For example, it is assumed that the display device displays as an object stays at a position A in a first frame and at a position B in a second frame. In the first frame, a line of sight of a person moves from the position A to the position B along an estimated movement path of the object. However, the object may not be actually displayed at an intermediate position, and may only be displayed at the positions A and B.

Finally, because luminance recognized by a person for the first frame may be an integrated value of luminance of pixels in a path between the position A and the position B, i.e. an average value between luminance of an object and luminance of a background, an object may be blurredly viewed.

Because a degree in which an object is blurredly viewed in a hold type display device may be proportional to a time period in which the display device sustains the display, a so-called impulse driving method in which an image is displayed for only a partial time period within one frame and a black color is displayed for the remaining time period has been suggested.

SUMMARY OF THE INVENTION

The present invention provides a display device and a method of driving the same.

The present invention provides an organic light emitting device compensating a data voltage in order to uniformly make a luminance of pixels, even if threshold voltages of driving transistors and an electric field effect mobility between pixels are not uniform, or even if a light-emitting element is degraded.

The present invention also provides an organic light emitting device compensating a data voltage to uniformly sustain a luminance of the organic light emitting element, even if a threshold voltage of the driving transistor and an electric field effect mobility of the driving transistor are sequentially changed, or even if a light emitting element is degraded.

Additional features of the invention will be set forth in the description which follows, and in part will be apparent from the description, or may be learned by practice of the invention.

The present invention discloses a display device including: a plurality of display pixels to display an image; a plurality of data lines connected to the display pixel; and a plurality of sensing lines connected to the display pixel, the display pixels including: a driving transistor, the driving transistor including a control terminal, an input terminal, and an output terminal; a capacitor connected to the control terminal of the driving transistor; a first switching transistor connected to the data line and the control terminal of the driving transistor; a light-emitting element to receive a driving current from the driving transistor, the light-emitting element to emit light; a second switching transistor connected between the sensing line and the output terminal of the driving transistor; and a third switching transistor connected between the output terminal of the driving transistor and the light-emitting element, wherein the driving transistor is a p-channel electric field effect transistor.

The present invention also discloses a method of driving a display device including a capacitor, a driving transistor connected to the capacitor, the driving transistor including a control terminal, an input terminal, and an output terminal, and a light-emitting element connected to the output terminal, the method including: connecting a data voltage to the control terminal; emitting light by the light-emitting element; and sensing a first voltage of the output terminal, wherein light emission of the light-emitting element is stopped, the control terminal and the output terminal are connected to a ground voltage, the control terminal and the output terminal are disconnected from the ground voltage, and then the first voltage of the output terminal is sensed.

The present invention also discloses a method of driving a display device including a capacitor, a driving transistor connected to the capacitor, the driving transistor including a control terminal, an input terminal, and an output terminal, and a light-emitting element connected to the output terminal, the method including: connecting a data voltage to the control terminal; emitting light by the light-emitting element; sensing a voltage of the output terminal; and correcting an input image signal based on the sensed voltage, wherein light emission of the light-emitting element is stopped, a reference current source is connected to the control terminal and the output terminal, and then the voltage of the output terminal is sensed.

The present invention also discloses a method of driving a display device including a capacitor, a driving transistor connected to the capacitor, the driving transistor including a control terminal, an input terminal, and an output terminal, and a light-emitting element connected to the output terminal, the method including: connecting a data voltage to the control terminal; emitting light by the light-emitting element; and sensing a voltage of the output terminal, wherein after repeating the connecting of a data voltage to the control terminal and the emitting of light by the light-emitting element, when the same voltage is connected to the input terminal and the control terminal, the voltage of the output terminal is sensed.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

Figure 1:
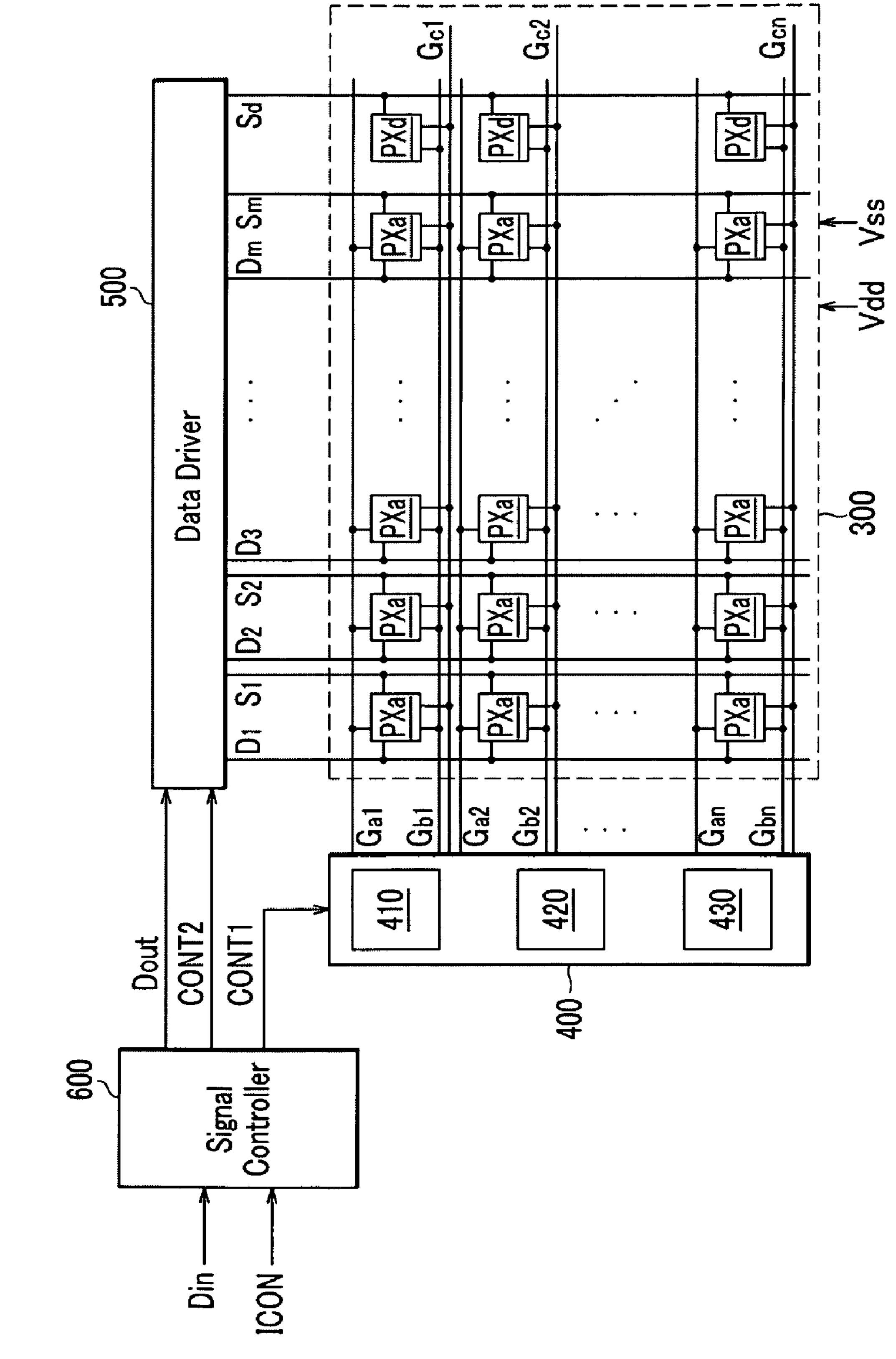
FIG. 1 is a block diagram of an organic light emitting device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

An organic light emitting device according to an exemplary embodiment of the present invention is described with reference to FIG. 1 and FIG. 2.

Figure 2:
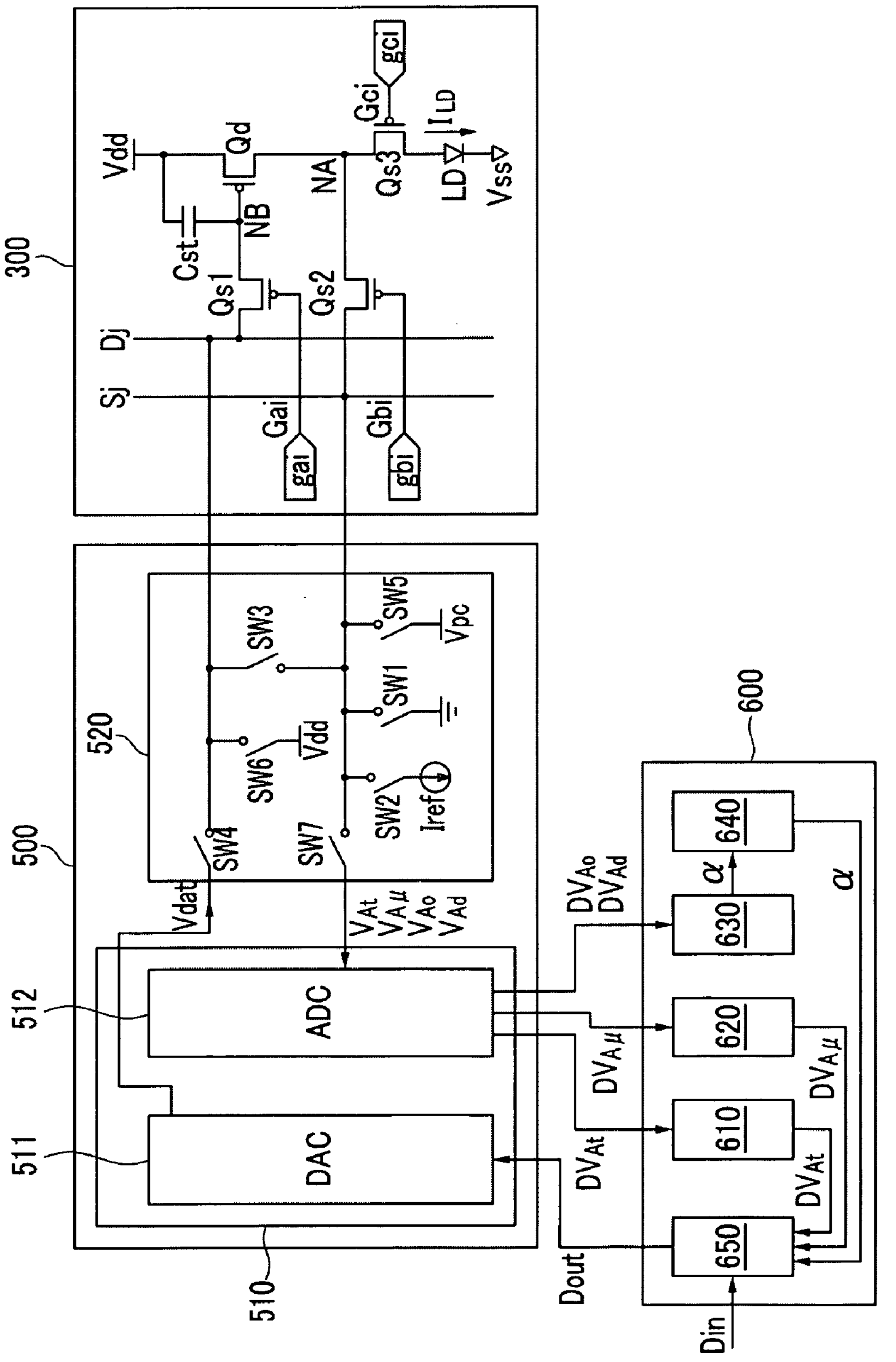
FIG. 2 is an equivalent circuit diagram of a pixel in an organic light emitting device according to an exemplary embodiment of the present invention.

FIG. 1 is a block diagram of an organic light emitting device according to an exemplary embodiment of the present invention, and FIG. 2 is an equivalent circuit diagram of a display pixel in an organic light emitting device according to an exemplary embodiment of the present invention.

Referring to FIG. 1, the organic light emitting device includes a display panel 300, a scanning driver 400, a data driver 500, and a signal controller 600.

The display panel 300 includes a plurality of signal lines $G_{a1}$-$G_{an}$, $G_{b1}$-$G_{bn}$, $G_{c1}$-$G_{cn}$, $S_1$-$S_m$, $S_d$, and $D_1$-$D_m$, a plurality of voltage lines (not shown), a plurality of display pixels PXa that are connected thereto and that are arranged in approximately a matrix form, and a plurality of dummy pixels PXd.

The signal lines $G_{a1}$-$G_{an}$, $G_{b1}$-$G_{bn}$, $G_{c1}$-$G_{cn}$, $S_1$-$S_m$, $S_d$, and $D_1$-$D_m$ include a plurality of first scanning signal lines $G_{a1}$-$G_{an}$ that transfer a first scanning signal, a plurality of second scanning signal lines $G_{b1}$-$G_{bn}$ that transfer a second scanning signal, a plurality of third scanning signal lines $G_{c1}$-$G_{cn}$ that transfer a third scanning signal, a plurality of sensing lines $S_1$-$S_m$ and $S_d$ that transfer a sensing signal, and a plurality of data lines $D_1$-$D_m$ that transfer an image data signal. The first scanning signal lines $G_{a1}$-$G_{an}$, the second scanning signal lines $G_{b1}$-$G_{bn}$, and the third scanning signal lines $G_{c1}$-$G_{cn}$ extend in a row direction and are substantially parallel to each other, and the sensing lines $S_1$-$S_m$ and $S_d$ and the data lines $D_1$-$D_m$ extend in a column direction and are substantially parallel to each other.

The display pixel PXa is a pixel that displays an actual image and is connected to the first to third scanning signal lines $G_{a1}$-$G_{an}$, $G_{b1}$-$G_{bn}$, and $G_{c1}$-$G_{cn}$, the sensing lines $S_1$-$S_m$, and the data lines $D_1$-$D_m$. In contrast, the dummy pixel PXd is a pixel that does not display an actual image and is connected only to the second scanning signal lines $G_{b1}$-$G_{bn}$, the third scanning signal lines $G_{c1}$-$G_{cn}$, and the sensing line $S_d$.

The voltage line includes a driving voltage line (not shown) that transfers a driving voltage.

As shown in FIG. 2, the display panel 300 includes a display pixel PXa, which includes an organic light emitting element LD, a driving transistor Qd, a capacitor Cst, and first, second, and third switching transistors Qs1-Qs3.

The driving transistor Qd has an output terminal, an input terminal, and a control terminal. The control terminal of the driving transistor Qd is connected to the capacitor Cst and the first switching transistor Qs1 at a contact point NB, the input terminal of the driving transistor Qd is connected to a driving voltage Vdd, and the output terminal of the driving transistor Qd is connected to the second and third switching transistors Qs2 and Qs3 at a contact point NA.

One end of the capacitor Cst is connected to the driving transistor Qd at a contact point NB, and the other end of the capacitor Cst is connected to the driving voltage Vdd.

The first switching transistor Qs1 operates in response to a first scanning signal $g_{ai}$, the second switching transistor Qs2 operates in response to a second scanning signal $g_{bi}$, and the third switching transistor Qs3 operates in response to a third scanning signal $g_{ci}$.

The first switching transistor Qs1 is connected between the data line Dj and the contact point NB, the second switching transistor Qs2 is connected between the sensing line Sj and the contact point NA, and the third switching transistor Qs3 is connected between the contact point NA and the organic light emitting element LD.

The driving transistor Qd and the first to third switching transistors Qs1, Qs2, and Qs3 are p-channel electric field effect transistors. The electric field effect transistor includes, for example, a TFT, and the TFT may include polysilicon.

An anode and a cathode of the organic light emitting element LD are connected to the third switching transistor Qs3 and a common voltage Vss, respectively. The organic light emitting element LD displays an image by emitting light with different intensity according to a magnitude of a current $I_{LD}$ that is supplied by the driving transistor Qd through the third switching transistor Qs3, and a magnitude of the current $I_{LD}$ depends on a magnitude of a voltage between the control terminal and the input terminal of the driving transistor Qd.

The dummy pixel PXd is formed at one side of the display panel 300. Like the display pixel PXa, the dummy pixel PXd may include the organic light emitting element LD, the driving transistor Qd, the capacitor Cst, and the first, second, and third switching transistors Qs1-Qs3.

Referring again to FIG. 1, the scanning driver 400 includes a first scanning driver 410 that is connected to the first scanning signal lines $G_{a1}$-$G_{an}$ of the display panel 300, a second scanning driver 420 that is connected to the second scanning signal lines $G_{b1}$-$G_{bn}$, and a third scanning driver 430 that is connected to the third scanning signal lines $G_{c1}$-$G_{cn}$. The first to third scanning drivers 410, 420, and 430 apply the first scanning signal $g_{ai}$, the second scanning signal $g_{bi}$, and the third scanning signal $g_{ci}$, each of which includes a combination of a high voltage Von and a low voltage Voff, to the first scanning signal lines $G_{a1}$-$G_{an}$, the second scanning signal lines $G_{b1}$-$G_{bn}$, and the third scanning signal lines $G_{c1}$-$G_{cn}$, respectively.

The high voltage Von turns off the first to third switching transistors Qs1-3, and the low voltage Voff turns on the first to third switching transistors Qs1-3.

The data driver 500 includes a basic circuit portion 510 and a switching circuit portion 520.

The basic circuit portion 510 includes a digital-to-analog converter 511 and an analog-to-digital converter 512.

The digital-to-analog converter 511 receives a digital output image signal Dout for each row of display pixels PXa, converts the digital output image signal Dout to an analog data voltage Vdat, and applies the analog data voltage Vdat to the data lines $D_1$-$D_m$. The analog-to-digital converter 512 receives first to fourth sensing signals $V_{At}$, $V_{A\mu}$, $V_{Ao}$, and $V_{Ad}$ from each display pixel PXa through the sensing line Sj and converts and outputs the first to fourth sensing signals $V_{At}$, $V_{A\mu}$, $V_{Ao}$, and $V_{Ad}$ as digital values $DV_{At}$, $DV_{A\mu}$, $DV_{Ao}$, and $DV_{Ad}$.

The switching circuit portion 520 includes a first switch SW1 that switches the second switching transistor Qs2 and a ground voltage, a second switch SW2 that switches the second switching transistor Qs2 and a reference current source Iref, a third switch SW3 that switches the sensing line Sj and the data line Dj, a fourth switch SW4 that switches the data line Dj and the digital-to-analog converter 511, a fifth switch SW5 that switches the sensing line Sj and a precharging voltage Vpc, a sixth switch SW6 that switches the driving voltage Vdd and the data line Dj, and a seventh switch SW7 that switches the sensing line Sj and the analog-to-digital converter 512.

The signal controller 600 controls operations of the scanning driver 400 and the data driver 500, receives an input image signal Din, corrects the input image signal Din according to characteristics of the driving transistor Qd and characteristics of the organic light emitting element LD, and outputs the corrected input image signal Din as an output image signal Dout.

The signal controller 600 includes a first frame memory 610, a second frame memory 620, a lookup table 630, a third frame memory 640, and an image signal correction unit 650.

The first frame memory 610 receives and stores a first sensing signal $V_{At}$ that is sensed in the display pixel PXa in a digital form $DV_{At}$ through the analog-to-digital converter 512.

The second frame memory 620 receives and stores a second sensing signal $V_{A\mu}$ that is sensed in the display pixel PXa in a digital form $DV_{A\mu}$ through the analog-to-digital converter 512.

The lookup table 630 receives the third and fourth sensing signals $V_{Ao}$ and $V_{Ad}$ in digital forms $DV_{Ao}$ and $DV_{Ad}$ through the analog-to-digital converter 512 and stores a degradation factor α that is determined according to pairs of the third and fourth sensing signals $DV_{Ao}$ and $DV_{Ad}$. In this case, the degradation factor α represents a degradation degree of the organic light emitting element LD of the display pixel PXa. In this case, the lookup table 630 stores a degradation factor α having a luminance value of 100% when a difference value between the third and fourth sensing signals $V_{Ao}$ and $V_{Ad}$ is 0, and the degradation factor α has a luminance value decreasing in an exponential function form as the difference value increases.

The third frame memory 640 receives and stores the corresponding degradation factor α from the lookup table 630.

The image signal correction unit 650 corrects the input image signal Din based on the first sensing signal $DV_{At}$, the second sensing signal $DV_{A\mu}$, and the degradation factor α and outputs the corrected signal as an output image signal Dout. The image signal correction unit 650 may include a calculation circuit.

Each of the driving devices 400, 500, and 600 may be directly mounted on the display panel 300 in at least one integrated circuit (IC) chip form, be mounted on a flexible printed circuit film (not shown) to be attached to the display panel 300 in a tape carrier package (TCP) form, or be mounted on a separate printed circuit board (PCB) (not shown). Alternatively, the driving devices 400, 500, and 600 together with the signal lines $G_{a1}$-$G_{3n}$, $G_{b1}$-$G_{bn}$, $G_{c1}$-$G_{cn}$, $S_1$-$S_m$, $S_d$, and $D_1$-$D_m$ and the transistors Qs1-Qs3 and Qd may be integrated to the display panel 300. Further, the driving devices 400, 500, and 600 may be integrated into a single chip, and in this case, at least one of them or at least one circuit element constituting them may be formed outside of the single chip.

A method of compensating an input image signal in the image signal correction unit 650 of the signal controller 600 of the organic light emitting device, according to characteristics of a driving transistor and an organic light emitting element, is described in detail below.

A current $I_{QD}$ that flows to the driving TFT Qd of FIG. 2 may be represented by Equation 1.

$$I_{QD} = \frac{1}{2}\mu C_{ox}\frac{W}{L}(Vsg - |Vtht|)^2 \quad \text{(Equation 1)}$$

where μ is electric field effect mobility, $C_{OX}$ is capacity of a gate insulating layer, W is a channel width of the driving transistor Qd, L is a channel length of the driving transistor Qd, Vtht is the threshold voltage of the driving transistor Qd, and Vsg is a voltage difference Vs−Vg between the input terminal and the control terminal of the driving transistor Qd.

In Equation 1, in consideration of compensation due to degradation of the organic light emitting element LD and a characteristic deviation of the driving transistor Qd, a maximum current Imax on a gray basis is represented by Equation 2.

$$\frac{100}{\alpha}\times\frac{\text{corresponding gray value}}{2^n-1}\times I_{max}=\frac{1}{2}\mu C_{ox}\frac{W}{L}(Vs-Vg-|Vtht|)^2 \quad \text{(Equation 2)}$$

where N is the quantity of bits of an input image signal, Vs is a voltage of a source electrode of the driving transistor Qd, and as the source electrode of the driving transistor Qd is connected to a driving voltage Vdd, Vs is a driving voltage Vdd. For example, if the quantity n of bits of an input image signal is 8, the corresponding gray value is between 0 to 255.

In Equation 2, a voltage Vg that is applied to the control terminal of the driving transistor Qd is represented by Equation 3.

$$Vg=Vs-\sqrt{\frac{100}{\alpha}}\sqrt{\frac{\text{corresponding gray value}}{2^n-1}}\sqrt{\frac{2I_{max}}{\mu C_{ox}\frac{W}{L}}}-|Vtht| \quad \text{(Equation 3)}$$

Therefore, a voltage Vg applied to the control terminal of the driving transistor Qd, i.e., a data voltage Vdat in each gray of each display pixel PXa, can be obtained when knowing a threshold voltage Vtht of the driving transistor Qd, electric field effect mobility μ of the driving transistor Qd, and a degradation factor α of the organic light emitting element LD. However, by measuring a first sensing signal $V_{At}$ that is related to the threshold voltage Vtht of the driving transistor Qd, a second sensing signal $V_{A\mu}$ that is related to the electric field effect mobility μ of the driving transistor Qd, and third and fourth sensing signals $V_{Ao}$ and $V_{Ad}$ that are related to the degradation factor α of the organic light emitting element LD, a data voltage Vdat to be applied in each gray in each pixel PXa is determined by Equation 3. Because the data voltage Vdat is an analog voltage that is selected according to an output image signal Dout that is output from the signal controller 600, an input image signal Din is corrected and output to an output image signal Dout to correspond to Equation 3 in the image signal correction unit 650.

The first sensing signal $V_{At}$ that is related to a threshold voltage Vtht of the driving transistor Qd, the second sensing signal $V_{A\mu}$ that is related to electric field effect mobility μ of the driving transistor Qd, and the third and fourth sensing signals $V_{Ao}$ and $V_{Ad}$ that are related to a degradation factor α of the organic light emitting element LD can be sensed for a time period in which the organic light emitting element LD of the display pixel PXa stops light emission after emitting light in each frame. However, all three voltages are not sensed but only one of three is sensed for a time period in which the organic light emitting element LD stops light emission after emitting light. The remaining two that are not sensed may correct the input image signal Din using a previously sensed value or a predetermined average value.

Now, a method of obtaining the first to fourth sensing signals $V_{At}$, $V_{A\mu}$, $V_{Ao}$, and $V_{Ad}$ in an organic light emitting device according to an exemplary embodiment of the present invention is described in detail with reference to FIG. 1, FIG. 2, FIG. 3, FIG. 4, FIG. 5, FIG. 6, FIG. 7, FIG. 8, FIG. 9, FIG. 10, FIG. 11, and FIG. 12.

First, a method of obtaining the first sensing signal $V_{At}$ in an organic light emitting device according to an exemplary embodiment of the present invention is described with reference to FIG. 1, FIG. 2, FIG. 3, FIG. 4, FIG. 5, FIG. 6, and FIG. 7.

Figure 3:
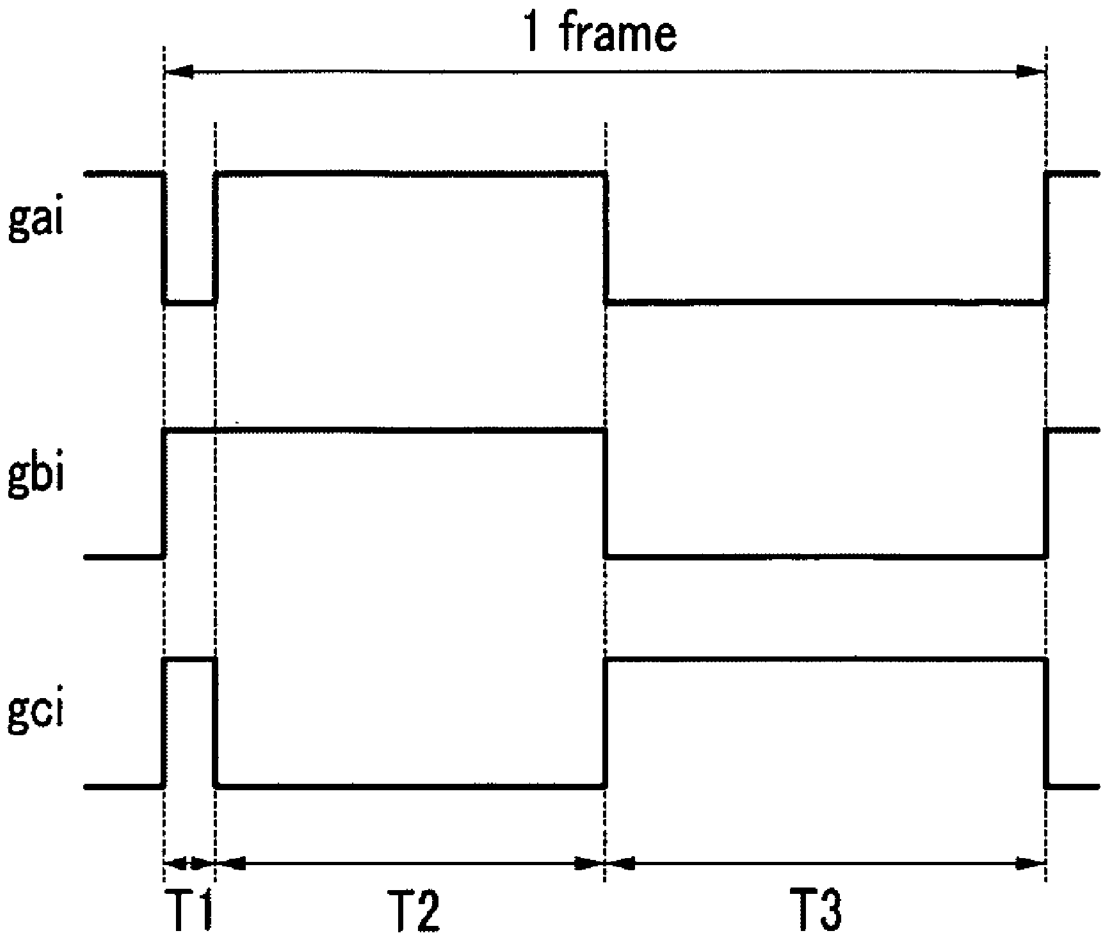
FIG. 3 shows an example of a waveform diagram showing a gate signal applied to one row of pixels in an organic light emitting device according to an exemplary embodiment of the present invention.

FIG. 3 shows an example of a waveform diagram showing a gate signal applied to one row of pixels in an organic light emitting device according to an exemplary embodiment of the present invention, and FIG. 4, FIG. 5, FIG. 6, and FIG. 7 are equivalent circuit diagrams of a pixel in each period shown in FIG. 3.

First, referring to FIG. 1 and FIG. 2, the signal controller 600 receives an input image signal Din and an input control signal ICON, which controls the display of the input image signal Din, from an external graphics controller (not shown). The input image signal Din includes luminance information of each display pixel PXa, and luminance thereof has grays of a given quantity, for example, $1024=2^{10}$, $256=2^8$, or $64=2^6$. The input control signal ICON includes, for example, a vertical synchronization signal, a horizontal synchronization signal, a main clock signal, and a data enable signal.

The signal controller 600 corrects the input image signal Din based on the input image signal Din and the input control signal ICON and generates a scanning control signal CONT1 and a data control signal CONT2. The signal controller 600 sends the scanning control signal CONT1 to the scanning driver 400 and sends the data control signal CONT2 and an output image signal Dout to the data driver 500.

The scanning control signal CONT1 includes three control signals that control the first to third scanning divers 410, 420, and 430, and each control signal may include a scanning start signal STV that instructs the scanning start, at least one clock signal CLK that controls an output period of a high voltage Von, and an output enable signal OE that limits a sustain time period of the high voltage Von.

The data control signal CONT2 includes a horizontal synchronization start signal HSYNC that notifies the transmission start of a digital image signal Dout for one row of display pixels PXa, and a data clock signal HCLK and a load signal that apply an analog data voltage to the data lines $D_1$-$D_m$.

The scanning driver 400 changes a voltage of the first to third scanning signals to a high voltage Von or a low voltage Voff according to the scanning control signal CONT1 from the signal controller 600.

According to the data control signal CONT2 from the signal controller 600, the data driver 500, particularly the basic circuit portion 510, receives a digital output image signal Dout for each row of display pixels PXa, converts the output image signal Dout to an analog data voltage Vdat, and then applies the analog data voltage Vdat to the data lines $D_1$-$D_m$. The data driver 500 outputs a data voltage Vdat for one row of display pixels PXa for one horizontal period 1H.

Hereinafter, a specific row of pixels, for example an i-th row of pixels, is described.

Referring to FIG. 3, the scanning driver 400 changes the first scanning signal $g_{ai}$ applied to a first scanning signal line $G_{ai}$ to a low voltage Voff according to the scanning control signal CONT1 from the signal controller 600, and changes the second scanning signal $g_{bi}$ applied to a second scanning signal line $G_{bi}$ and the third scanning signal $g_{ci}$ applied to a third scanning signal line $G_{ci}$ to a high voltage Von. The fourth switch SW4 is turned on.

Figure 4:
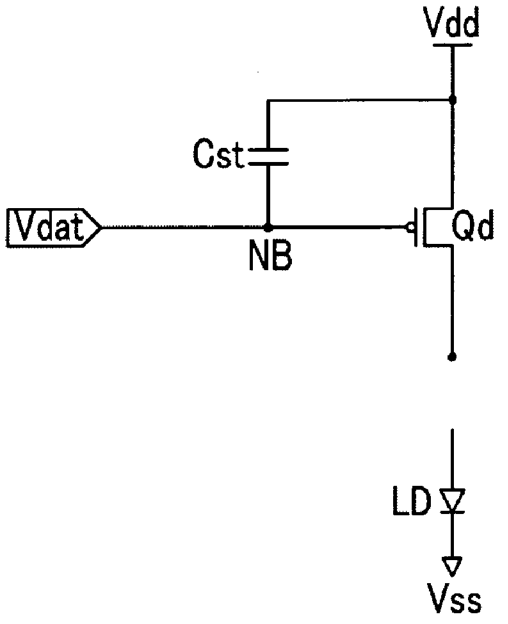
FIG. 4, FIG. 5, FIG. 6, FIG. 7, and FIG. 8 are equivalent circuit diagrams of a pixel in each period shown in FIG. 3.

Accordingly, as shown in FIG. 4, the first switching transistor Qs1 is turned on, and the second and third switching transistors Qs2 and Qs3 are turned off.

If the first switching transistor Qs1 is turned on, a data voltage Vdat is applied to the contact point NB, a voltage difference between the contact point NB and the driving voltage Vdd are stored in the capacitor Cst. Therefore, the driving transistor Qd is turned on to flow a current, but because the third switching transistor Qs3 is turned off, the organic light emitting element LD does not emit light. This is called a first data writing period T1.

Next, as shown in FIG. 3, the scanning driver 400 changes the first scanning signal $g_{ai}$ applied to the first scanning signal line $G_{ai}$ to a high voltage Von according to the scanning control signal CONT1 from the signal controller 600, sustains the second scanning signal $g_{bi}$ applied to the second scanning signal line $G_{bi}$ at a high voltage Von, and changes the third scanning signal $g_{ci}$ applied to the third scanning signal line $G_{ci}$ to a low voltage Voff. The fourth switch SW4 is turned off.

Figure 5:
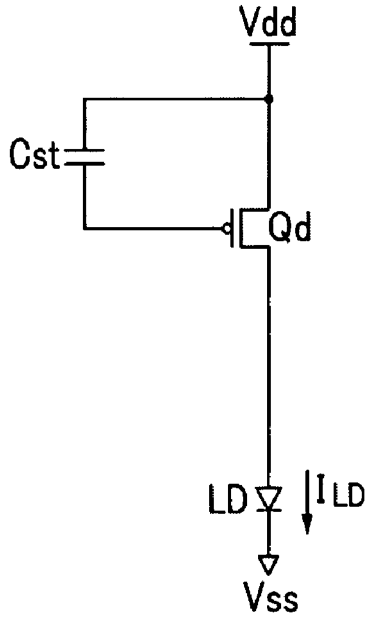

Accordingly, as shown in FIG. 5, the first switching transistor Qs1 is turned off, the second switching transistor Qs2 sustains a turned off state, and the third switching transistor Qs3 is turned on. In this case, the output terminal of the driving transistor Qd is connected to the organic light emitting element LD, and the driving transistor Qd flows an output current $I_{LD}$ that is controlled by a voltage difference Vsg between the control terminal and the input terminal of the driving transistor Qd to the organic light emitting element LD, so the organic light emitting element LD emits light. This period is a first light emitting period T2. Even if the first scanning signal $g_{ai}$ is changed to a high voltage Von and the first switching transistor Qs1 is turned off, a voltage charged to the capacitor Cst is continuously sustained for one frame and thus a control terminal voltage of the driving transistor Qd is uniformly sustained.

Next, as shown in FIG. 3, the scanning driver 400 changes the first scanning signal $g_{ai}$ applied to the first scanning signal line $G_{ai}$ to a low voltage Voff, changes the second scanning signal $g_{bi}$ applied to the second scanning signal line $G_{bi}$ to a low voltage Voff, and changes the third scanning signal $g_{ci}$ applied to the third scanning signal line $G_{ci}$ to a high voltage Von. The third switch SW3 is turned on, and the fourth switch SW4 is turned off.

Figure 6:
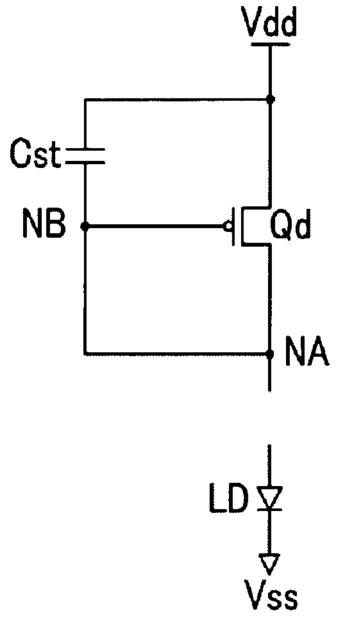

Accordingly, as shown in FIG. 6, the first switching transistor Qs1 is turned on, the second switching transistor Qs2 is turned on, and the third switching transistor Qs3 is turned off. If the third switching transistor Qs3 is turned off, the organic light emitting element LD stops light emission, and the display pixel PXa becomes black. This is called a first sensing period T3. In this case, two contact points NA and NB are connected.

Figure 7:
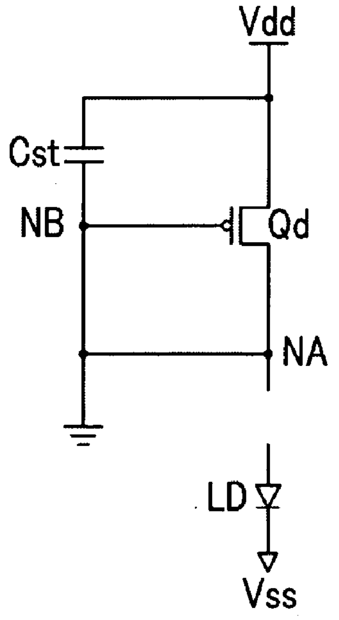

Thereafter, if the first switch SW1 is turned on, the control terminal and the output terminal of the driving transistor Qd are connected to a ground voltage, as shown in FIG. 7. Thereafter, the first switch SW1 is again turned off. Then, after a predetermined time period has elapsed, if the seventh switch SW7 is turned on, a voltage of the contact point NA is input to the analog-to-digital converter 512 through the sensing line Sj, and this is called a first sensing signal $V_{At}$. The first sensing signal $V_{At}$ is converted to a digital value $DV_A$ and the digital value $DV_A$ is output through the analog-to-digital converter 512.

As shown in FIG. 6 and FIG. 7, if the control terminal and the output terminal of the driving transistor Qd are connected to a ground voltage and are again disconnected, the driving transistor Qd is diode-connected. Accordingly, when the first switch SW1 is turned on, a voltage of the contact point NA becomes a ground voltage, after the first switch SW1 is turned off, when a predetermined time period has elapsed, the voltage rises and converges to a predetermined value. At this time, the voltage of the contact point NA is a first sensing signal $V_{At}$. In this case, a threshold voltage Vtht of the driving transistor Qd is obtained by Equation 4.

$$|Vtht| = Vdd - V_{At} \quad \text{(Equation 4)}$$

The first sensing signal $V_{At}$ of Equation 4 is represented by Equation 5.

$$V_{At} = Vdd - |Vtht| \quad \text{(Equation 5)}$$

The sum of the first data writing period T1 and the first light emitting period T2 may be equal to a length of the first sensing period T3, and the first sensing period T3 may be adjusted. Further, the sum of the three periods T1, T2, and T3 is substantially equal to one frame.

Now, a method of obtaining the second sensing signal $V_{A\mu}$ in an organic light emitting device according to an exemplary embodiment of the present invention is described with reference to FIG. 3, FIG. 4, FIG. 5, FIG. 6, FIG. 7, and FIG. 8.

When obtaining the second sensing signal $V_{A\mu}$, a data writing period, a light emitting period, and a sensing period are passed, and in order to distinguish from a case of obtaining the first sensing signal $V_{At}$, the data writing period, the light emitting period, and the sensing period are called a second data writing period, a second light emitting period, and a second sensing period. A pixel PXa circuit in the second data writing period and the second light emitting period is equal to the pixel PXa circuit of FIG. 4 and FIG. 5 in the first data writing period T1 and the first light emitting period T2.

Figure 8:
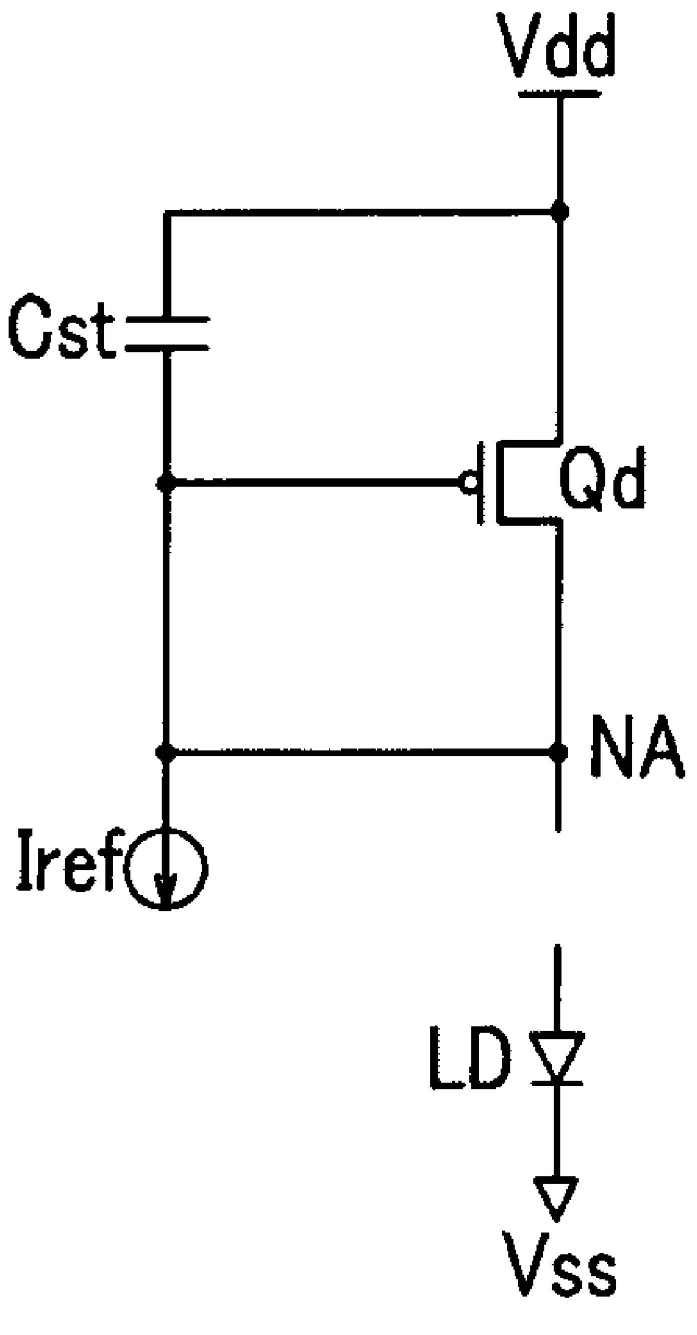

However, unlike the first sensing period T3, in the second sensing period, the second and third switches SW2 and SW3 are turned on. Accordingly, as shown in FIG. 8, the control terminal and the output terminal of the driving transistor Qd are turned on to a reference current Iref, and the reference current Iref flows to the driving TFT Qd. Thereafter, if the seventh switch SW7 is turned on, a voltage of the contact point NA is input to the analog-to-digital converter 512 through the sensing line Sj, and this is called a second sensing signal $V_{A\mu}$. The second sensing signal $V_{A\mu}$ is converted and output to a digital value $DV_{A\mu}$ through the analog-to-digital converter 512.

In FIG. 8, a reference current Iref flowing to the driving TFT Qd is represented by Equation 6.

$$Iref = \frac{1}{2}\mu C_{ox}\frac{W}{L}(Vs - Vg - |Vtht|)^2 \quad \text{(Equation 6)}$$

Equation 7 is obtained from Equation 6.
(Equation 7)

$$\sqrt{\frac{2Iref}{\mu C_{ox}\frac{W}{L}}} = Vs - Vg - |Vtht| \quad \text{(Equation7)}$$

where Vs is a driving voltage Vdd, and Vg is a second sensing signal $V_{A\mu}$.

The sum of the second data writing period and the second light emitting period may be equal to a length of the second sensing period, and the sum of the three periods is substantially equal to one frame.

Equation 3 is represented by Equation 8 using the first sensing signal $V_{At}$ and the second sensing signal $V_{A\mu}$ that are obtained in this way.

$$Vg = V_{At} - \sqrt{\frac{100}{\alpha}}\sqrt{\frac{\text{corresponding gray value}}{2^n - 1}}(V_{At} - V_{A\mu}) \quad \text{(Equation 8)}$$

Accordingly, the image signal correction unit 650 of the signal controller 600 corrects the input image signal Din according to Equation 8.

Now, a method of obtaining the third and fourth sensing signals $V_{Ao}$ and $V_{Ad}$ that are related to a degradation factor α in an organic light emitting device, according to an exemplary embodiment of the present invention, is described with reference to FIG. 9, FIG. 10, FIG. 11, and FIG. 12.

Figure 9:
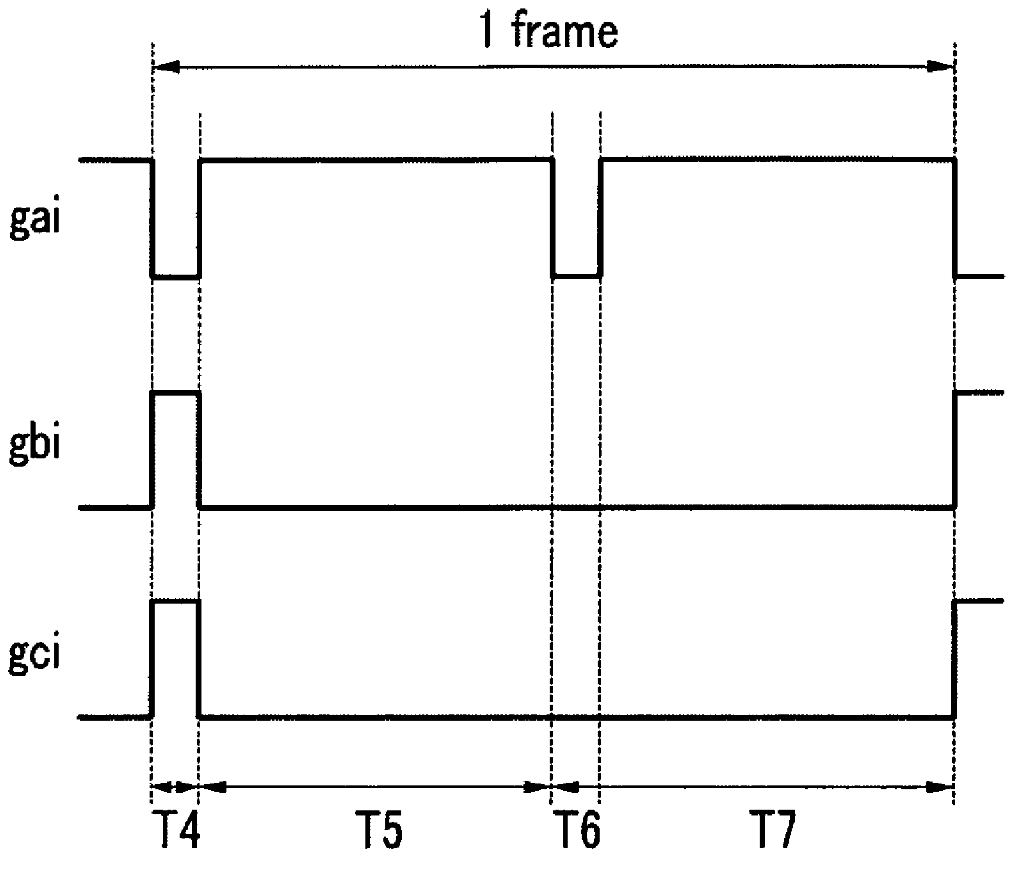
FIG. 9 shows another example of a waveform diagram showing a driving signal applied to one row of pixels in an organic light emitting device according to an exemplary embodiment of the present invention.

FIG. 9 shows another example of a waveform diagram showing a driving signal applied to one row of pixels in an organic light emitting device according to an exemplary embodiment of the present invention, and FIG. 10, FIG. 11, FIG. 12, and FIG. 13 are equivalent circuit diagrams of a pixel in each period shown in FIG. 9.

Referring to FIG. 9, the scanning driver 400 changes the first scanning signal $g_{ai}$ applied to the first scanning signal line $G_{ai}$ to a low voltage Voff according to the scanning control signal CONT1 from the signal controller 600, and changes the second scanning signal $g_{bi}$ applied to the second scanning signal line $G_{bi}$ and the third scanning signal $g_{ci}$ applied to the third scanning signal line $G_{ci}$ to a high voltage Von. The fourth switch SW4 and the fifth switch SW5 are turned on.

Figure 10:
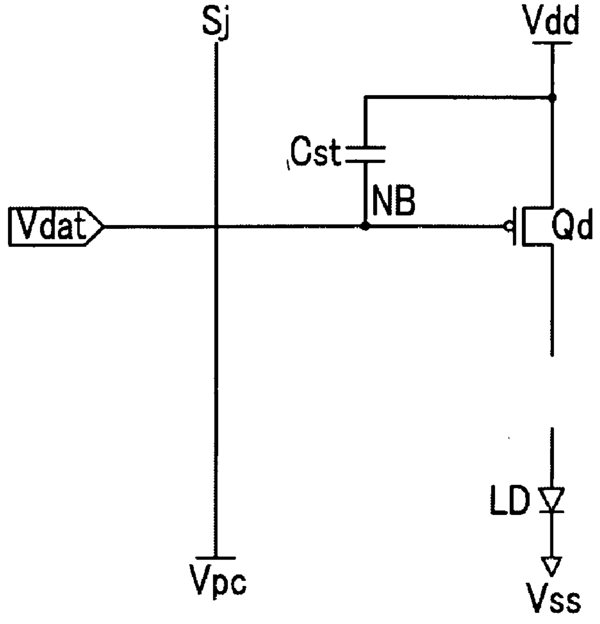
FIG. 10, FIG. 11, FIG. 12, and FIG. 13 are equivalent circuit diagrams of a pixel in each period shown in FIG. 9.

Accordingly, as shown in FIG. 10, the first switching transistor Qs1 is turned on, and the second and third switching transistors Qs2 and Qs3 are turned off.

If the first switching transistor Qs1 is turned on, a data voltage Vdat is applied to the contact point NB, and a voltage difference between the contact point N1 and the driving voltage Vdd is stored in the capacitor Cst. Therefore, the driving transistor Qd is turned on to flow a current, but because the third switching transistor Qs3 is turned off, the organic light emitting element LD does not emit light. This is called a third data writing period T4.

In this case, the sensing line Sj is connected to a precharging voltage Vpc to be precharged, and the precharging voltage Vpc is lower than a threshold voltage Vtho of the organic light emitting element LD.

Next, as shown in FIG. 9, the scanning driver 400 changes the first scanning signal $g_{ai}$ applied to the first scanning signal line $G_{ai}$ to a high voltage Von according to the scanning control signal CONT1 from the signal controller 600, changes the second scanning signal $g_{bi}$ applied to the second scanning signal line $G_{bi}$ to a low voltage Voff, and changes the third scanning signal $g_{ci}$ applied to the third scanning signal line $G_{ci}$ to a low voltage Voff. The fifth switch SW5 is turned off.

Figure 11:
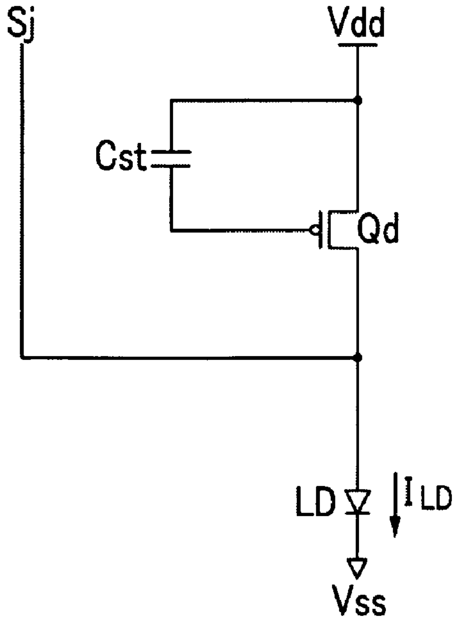

Accordingly, as shown in FIG. 11, the first switching transistor Qs1 is turned off, and the second and third switching transistors Qs2 and Qs3 are turned on. In this case, the output terminal of the driving transistor Qd is connected to the organic light emitting element LD, the driving transistor Qd flows an output current $I_{LD}$ that is controlled by a voltage difference Vsg between the control terminal and the input terminal of the driving transistor Qd to the organic light emitting element LD, and the organic light emitting element LD emits light. This period is called a third light emitting period T5. In this case, the sensing line Sj is floated. Even if the first scanning signal $g_{ai}$ is changed to a high voltage Von and the first switching transistor Qs1 is thus turned off, a voltage that is charged to the capacitor Cst is continuously sustained for one frame and thus a control terminal voltage of the driving transistor Qd is uniformly sustained.

In this case, because the sensing line Sj is precharged to a precharging voltage Vpc, which is a lower voltage than a threshold voltage Vtho of the organic light emitting element LD in the third data writing period T4, even if the sensing line Sj is floated in the third light emitting period T5, the voltage thereof does not rise and is sustained to be lower than a threshold voltage Vtht of the organic light emitting element LD. If a voltage of the sensing line Sj is higher than an anode voltage of the organic light emitting element LD, a current may flow to the sensing line Sj, not the organic light emitting element LD, and thus desired luminance cannot be sustained.

Next, the scanning driver 400 changes the first scanning signal $g_{ai}$ applied to the first scanning signal line $G_{ai}$ to a low voltage Voff, sustains the second scanning signal $g_{bi}$ applied to the second scanning signal line $G_{bi}$ at a low voltage Voff, and sustains the third scanning signal $g_{ci}$ applied the third scanning signal line $G_{ci}$ at a low voltage Voff. The fourth switch SW4 is turned off, and the sixth switch SW6 is turned on.

Figure 12:
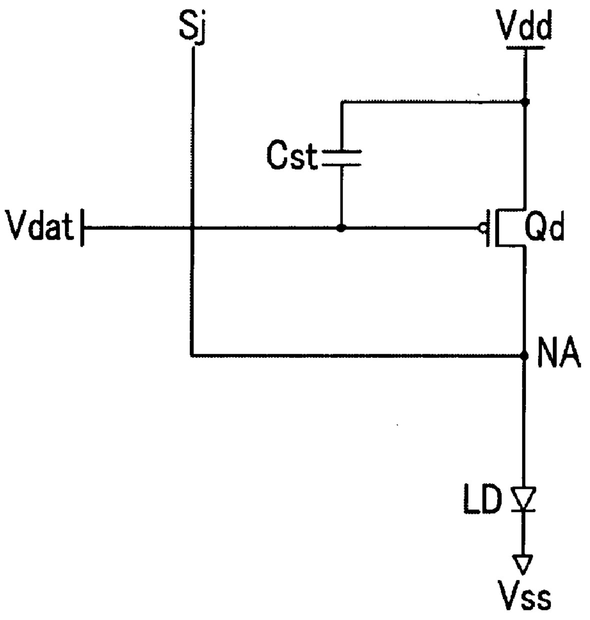

Accordingly, as shown in FIG. 12, the first switching transistor Qs1 is turned on and the second and third switching transistors Qs2 and Qs3 sustain a turned on state. A driving voltage Vdd is connected to the control terminal of the driving transistor Qd. Accordingly, because a charge voltage of the capacitor Cst becomes 0 Volts and a voltage difference between the control terminal and the input terminal of the driving transistor Qd becomes 0, a current does not flow to the driving transistor Qd, and even if the driving transistor Qd and the organic light emitting element LD are connected, the organic light emitting element LD stops light emission and the display pixel PXa becomes black. In this case, a voltage of the contact point NA, i.e., a voltage of an anode terminal of the organic light emitting element LD, declines. This is called a third sensing front period T6.

Thereafter, the scanning driver 400 changes the first scanning signal $g_{ai}$ applied to the first scanning signal line $G_{ai}$ to a high voltage Von, sustains the second scanning signal $g_{bi}$ applied to the second scanning signal line $G_{bi}$ at a low voltage Voff, and sustains the third scanning signal $g_{ci}$ applied to the third scanning signal line $G_{ci}$ at a low voltage Voff. The sixth switch SW6 is turned off.

Figure 13:
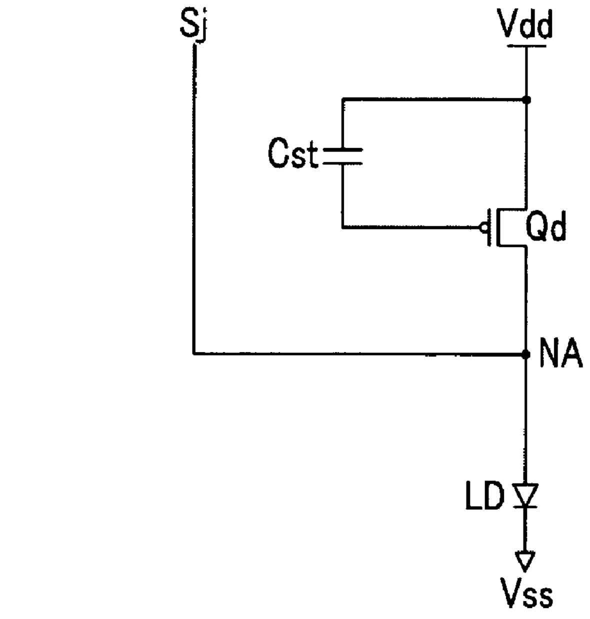

Accordingly, as shown in FIG. 13, the first switching transistor Qs1 is turned off and the second and third switching transistors Qs2 and Qs3 sustain a turned on state. Because a charge voltage of the capacitor Cst sustains 0 Volts, a control terminal voltage of the driving transistor Qd is sustained equally to a driving voltage Vdd, and thus a current does not flow to the driving transistor Qd. Accordingly, the organic light emitting element LD sustains a stop state of light emission. A voltage of an anode terminal of the organic light emitting element LD continuously declines after the third sensing front period T6, and after a predetermined time period has elapsed, a voltage of the contact point NA, i.e., a voltage of an anode terminal of the organic light emitting element LD, converges to a fixed value, and this is a threshold voltage Vtho of the organic light emitting element LD. This is called a third sensing rear period T7.

Thereafter, if the seventh switch SW7 is turned on, a voltage of the contact point NA is input to the analog-to-digital converter 512 through the sensing line Sj, and this is called a third sensing signal $V_{Ao}$. The third sensing signal $V_{Ao}$ is converted to a digital value $DV_{Ao}$ and the digital value $DV_{Ao}$ is output through the analog-to-digital converter 512.

The sum of the third data writing period T4 and the third light emitting period T5 may be equal to the sum of the third sensing front period T6 and the fourth sensing front period T7, and the sum of the four periods T4, T5, T6, and T7 is substantially equal to one frame.

A description of FIG. 9, FIG. 10, FIG. 11, FIG. 12, and FIG. 13 is a description of the display pixel PXa that performs an actual display operation. In the display pixel PXa, while the third sensing signal $V_{Ad}$ is sensed, a voltage of the contact point NA of the dummy pixel PXd that does not contribute to image display is sensed as a fourth sensing signal $V_{Ad}$. A circuit diagram and an operation thereof are identical to those of FIG. 12 and FIG. 13. The sensed fourth sensing signal $V_{Ad}$ is stored with a digital value $DV_{Ad}$ through the analog-to-digital converter 512.

As described above, the third and fourth sensing signals $DV_{Ao}$ and $DV_{Ad}$ are input to the lookup table 630 and thus the organic light emitting element LD outputs a degradation factor $\alpha$ representing a degraded degree, and this is stored in the third frame memory 640.

If degradation of the organic light emitting element LD is determined by a predetermined other reference, the reference is a numerical value in which a use environment of the display device, for example a temperature change, etc., is not considered, and thus it may be difficult to accurately determine. However, because the organic light emitting device according to an exemplary embodiment of the present invention determines degradation of the organic light emitting element LD based on the organic light emitting element LD of the dummy pixel PXd existing within the same display device, in consideration of a use environment of the display device, for example the temperature, a degradation degree of the organic light emitting element LD can be determined.

In this way, if a data voltage Vdat is corrected in consideration of a threshold voltage Vtht of the driving transistor Qd, electric field effect mobility $\mu$ of the driving transistor Qd, and a degradation factor $\alpha$ of the organic light emitting element LD, even if the threshold voltage Vtht of the driving transistor Qd, the electric field effect mobility $\mu$ of the driving transistor Qd, and the organic light emitting element LD are sequentially degraded, a current flowing to the organic light emitting element LD can be uniformly sustained and thus luminance of the organic light emitting device can be uniformly sustained.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:

a plurality of display pixels configured to display an image;

a plurality of data lines connected to the display pixels; and a plurality of sensing lines connected to the display pixels, wherein each display pixel comprises:

- a driving transistor comprising a control terminal, an input terminal, and an output terminal;
- a capacitor connected to the control terminal of the driving transistor;
- a first switching transistor connected between the data line and the control terminal of the driving transistor;
- a light-emitting element to receive a driving current from the driving transistor, the light-emitting element to emit light;
- a second switching transistor connected between the sensing line and the output terminal of the driving transistor; and
- a third switching transistor connected between the output terminal of the driving transistor and the light-emitting element, and wherein the driving transistor is a p-channel electric field effect transistor.

2. The display device of claim 1, further comprising:

a signal controller configured to correct an input image signal and to output an output image signal in consideration of a threshold voltage of the driving transistor; and a data driver configured to determine an image data voltage based on the output image signal and to apply the image data voltage to the data line.

3. The display device of claim 2, wherein the sensing line is configured to transfer a sensing signal from the display pixel to the data driver, and the sensing signal comprises a first sensing signal related to the threshold voltage of the driving transistor.

4. The display device of claim 3, wherein the signal controller comprises a first frame memory configured to store the first sensing signal.

5. The display device of claim 4, wherein the signal controller is configured to correct the input image signal and output the output image signal in consideration of an electric field effect mobility of the driving transistor.

6. The display device of claim 5, wherein the sensing signal further comprises a second sensing signal related to the electric field effect mobility of the driving transistor, and the signal controller further comprises a second frame memory configured to store the second sensing signal.

7. The display device of claim 6, wherein the signal controller is configured to correct the input image signal and output the output image signal in consideration of a degradation of the light-emitting element.

8. The display device of claim 7, further comprising a plurality of dummy pixels configured to not display an image, wherein the degradation of the light-emitting element is determined by comparing a threshold voltage of a light-emitting element of the display pixel and a threshold voltage of a light-emitting element of the dummy pixel.

9. The display device of claim 8, wherein the signal controller further comprises:

a lookup table configured to store a degradation factor representing a degradation degree of the light-emitting element; and a third frame memory configured to receive and to store the degradation factor from the lookup table.

10. The display device of claim 9, wherein the signal controller further comprises an image signal correction unit configured to correct the input image signal based on the first sensing signal, the second sensing signal, and the degradation factor.

11. The display device of claim 2, wherein the data driver comprises a basic circuit portion and a switching circuit portion, wherein the basic circuit portion comprises:

- a digital-to-analog converter configured to convert the output image signal to the image data voltage; and
- an analog-to-digital converter configured to receive the first sensing signal, the second sensing signal, a third sensing signal, and a fourth sensing signal from the display pixel, the analog-to-digital converter configured to convert the received sensing signal.

12. The display device of claim 11, wherein the switching circuit portion comprises:

a first switch configured to switch the second switching transistor and a ground voltage;

a second switch configured to switch the second switching transistor and a reference current source;

a third switch configured to switch the data line and the sensing line;

a fourth switch configured to switch the data line and the digital-analog converter;

a fifth switch configured to switch the sensing line and a precharging voltage;

a sixth switch configured to switch the data line and a driving voltage; and a seventh switch configured to switch the sensing line and the analog-to-digital converter.

13. The display device of claim 1, wherein the first switching transistor, the second switching transistor, and the third switching transistor are each p-channel electric field effect transistors.

14. A method of driving a display device comprising a capacitor, a driving transistor connected to the capacitor, the driving transistor comprising a control terminal, an input terminal, and an output terminal, and a light-emitting element connected to the output terminal, the method comprising:

connecting a data voltage to the control terminal;

emitting light by the light-emitting element; and sensing a first voltage of the output terminal, wherein light emission of the light-emitting element is stopped, the control terminal and the output terminal are connected to a ground voltage, the control terminal and the output terminal are disconnected from the ground voltage, and then the first voltage of the output terminal is sensed.

15. The method of claim 14, further comprising sensing a second voltage of the output terminal by connecting a data voltage to the control terminal and emitting light by the light-emitting element, then light emission of the light-emitting element is stopped, a reference current source is connected to the control terminal and the output terminal, and then the second voltage of the output terminal is sensed.

16. The method of claim 15, further comprising sensing a third voltage of the output terminal after connecting a data voltage to the control terminal and the emitting of light by the light-emitting element, wherein when the same voltage is connected to the input terminal and the control terminal, the third voltage is sensed.

17. The method of claim 16, further comprising calculating a degradation factor representing a degradation of the light-emitting element by comparing the third voltage with a reference threshold voltage.

18. The method of claim 17, wherein the reference threshold voltage is an anode voltage of a light-emitting element disposed in a dummy pixel that does not perform a display operation.

19. The method of claim 17, further comprising correcting an input image signal based on the first voltage, the second voltage, and the degradation factor.

20. The method of claim 16, wherein sensing the first voltage, sensing the second voltage, and sensing the third voltage are performed within different frames.

21. A method of driving a display device comprising a capacitor, a driving transistor connected to the capacitor, the driving transistor comprising a control terminal, an input terminal, and an output terminal, and a light-emitting element connected to the output terminal, the method comprising:

connecting a data voltage to the control terminal;

emitting light by the light-emitting element;

sensing a voltage of the output terminal; and correcting an input image signal based on the sensed voltage, wherein light emission of the light-emitting element is stopped, a reference current source is connected to the control terminal and the output terminal, and then the voltage of the output terminal is sensed.

22. A method of driving a display device comprising a capacitor, a driving transistor connected to the capacitor, the driving transistor comprising a control terminal, an input terminal, and an output terminal, and a light-emitting element connected to the output terminal, the method comprising:

connecting a data voltage to the control terminal;

emitting light by the light-emitting element; and sensing a voltage of the output terminal, wherein after repeating the connecting of a data voltage to the control terminal and the emitting of light by the light-emitting element, when the same voltage is connected to the input terminal and the control terminal, the voltage of the output terminal is sensed.

23. The method of claim 22, further comprising:

calculating a degradation factor representing a degradation of the light-emitting element by comparing the voltage of the output terminal with a reference threshold voltage; and correcting an input image signal based on the degradation factor.

24. The method of claim 23, wherein the reference threshold voltage is an anode voltage of a light-emitting element disposed in a dummy pixel that does not perform a display operation.

* * * * *